A. GOODYEAR, 2d.
VEHICLE SPRING.

No. 182,066. Patented Sept. 12, 1876.

Witnesses  
Amarillis Doolittle  
Andrew J. Doolittle

Inventor  
Albert Goodyear 2d

UNITED STATES PATENT OFFICE.

ALBERT GOODYEAR, 2D, OF HAMDEN, CONNECTICUT.

IMPROVEMENT IN VEHICLE-SPRINGS.

Specification forming part of Letters Patent No. 182,066, dated September 12, 1876; application filed March 8, 1876.

*To all whom it may concern:*

Be it known that I, ALBERT GOODYEAR, 2d, of Hamden, in the county of New Haven and State of Connecticut, have invented certain Improvements in Carriage-Springs, of which the following is a specification:

My invention consists mainly in a peculiar combination of wood and gum-elastic or india-rubber, with joints and fastenings of iron, the said combination being conducive to elasticity without the severe reciprocation of ordinary steel springs.

Figure 1:
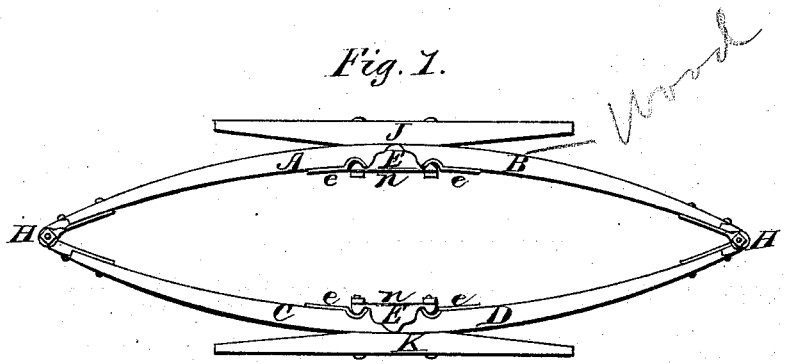
Figure 2:
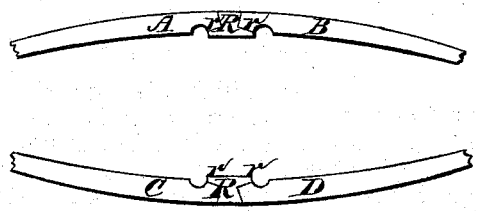
Figure 3:
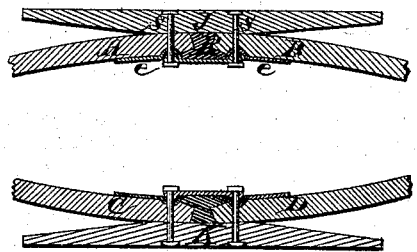
Figure 4:
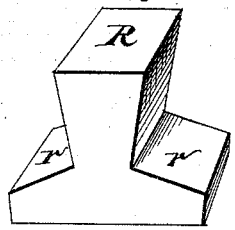

Figure 1 is a side elevation. Fig. 2 is an elevation showing the wood and the rubber without the iron-work. Fig. 3 is a central longitudinal section. Fig. 4 is a full size perspective view of the rubber employed at the spring centers.

A B C D are four short springs of wood, (hickory or white-ash preferred,) to the inner end of each of which is attached a bent iron plate, e, and the springs being arranged in the order represented in Fig. 2, a block of rubber, R, having flanges r r, is placed between the inner ends of each pair of springs, and each pair are connected by a central connecting plate or clip, n. The sides are extended laterally, and bent outward, forming the ears E E, which inclose the rubber R, but not so closely as to prevent its elasticity. Each pair of springs are connected at the outward ends by hinges H H, and each pair of springs and plates e, with the connecting-clip n, are attached to a cross-head or cleat, J K, by means of the screws s s, as shown in Fig. 3.

I do not claim making springs in two parts in the center with hinges or bolts. This is old. Nor do I claim putting rubber on the outside of the spring, nor rubber plugs in the spring, nor rubber on the ends of springs; but

What I claim as new, and wish to secure by Letters Patent, is—

The block of india-rubber R r r, with flanges or T-shaped extensions, in combination with the inner ends of the spring, constructed and arranged in the manner and for the purpose herein described.

ALBERT GOODYEAR, 2D.

Witnesses:
AMARILLIS DOOLITTLE,
A. J. DOOLITTLE.